United States Patent
Sparks

(10) Patent No.: US 10,527,111 B2
(45) Date of Patent: Jan. 7, 2020

(54) WORK VEHICLE DRIVE ASSEMBLY WITH ELECTRIC MOTOR OVERSPEED PROTECTION

(71) Applicant: Deere & Company, Moline, IL (US)

(72) Inventor: Richard M. Sparks, Bartlesville, OK (US)

(73) Assignee: DEERE & COMPANY, Moline, IL (US)

( * ) Notice: Subject to any disclaimer, the term of this patent is extended or adjusted under 35 U.S.C. 154(b) by 365 days.

(21) Appl. No.: 15/332,272

(22) Filed: Oct. 24, 2016

(65) Prior Publication Data
US 2018/0112726 A1 Apr. 26, 2018

(51) Int. Cl.
| F16D 48/06 | (2006.01) |
| F16D 13/52 | (2006.01) |
| F16D 25/0638 | (2006.01) |
| B60K 25/00 | (2006.01) |
| F16H 1/28 | (2006.01) |

(52) U.S. Cl.
CPC ............. *F16D 48/06* (2013.01); *F16D 13/52* (2013.01); *F16D 25/0638* (2013.01); *B60K 25/00* (2013.01); *F16D 2500/10437* (2013.01); *F16D 2500/30415* (2013.01); *F16D 2500/507* (2013.01); *F16H 1/28* (2013.01)

(58) Field of Classification Search
CPC ........ F16H 1/28; F16D 13/52; F16D 25/0638; F16D 2500/10437; F16D 48/06; F16D 7/027; F16D 2055/30415; F16D 2500/30407; F16D 2200/2005
See application file for complete search history.

(56) References Cited

U.S. PATENT DOCUMENTS 5,303,807 A  4/1994 Domeneghini
5,791,447 A * 8/1998 Lamela ............... F16D 25/0638
192/111.1
(Continued)

FOREIGN PATENT DOCUMENTS

DE  3420964 C1  10/1985
DE  3720208 A1  12/1988
(Continued)

OTHER PUBLICATIONS

English language Abstract of JP360146937A (Year: 2019).*
(Continued)

*Primary Examiner* — Stacey A Fluhart
(74) *Attorney, Agent, or Firm* — Klintworth & Rozenblat IP LLP

(57) ABSTRACT

A drive assembly for a work vehicle includes an electric motor configured to rotate a driving shaft and a gear train configured to transmit torque between the driving shaft and a driven shaft. The drive assembly also includes a clutch member having an engaged position and a disengaged position. The clutch member is configured to allow torque transfer between the driving shaft and the driven shaft when in the engaged position. The clutch member is configured to prevent torque transfer between the driving shaft and the driven shaft when in the disengaged position. The clutch member is biased toward the disengaged position to prevent torque transfer in a direction from the driven shaft toward the driving shaft in an overspeed condition of the drive assembly.

13 Claims, 5 Drawing Sheets

(56) References Cited

U.S. PATENT DOCUMENTS

| | | | | |
|---|---|---|---|---|
| 6,080,085 A | * | 6/2000 | Kosik | F16D 48/066 |
| | | | | 477/180 |
| 6,189,669 B1 | * | 2/2001 | Kremer | F16D 25/0638 |
| | | | | 188/264 E |
| 2004/0079608 A1 | * | 4/2004 | Kupper | F16D 48/06 |
| | | | | 192/103 R |
| 2005/0224309 A1 | * | 10/2005 | Duwel | F16D 25/0638 |
| | | | | 192/106 F |
| 2007/0256797 A1 | | 11/2007 | Orton et al. | |
| 2012/0138412 A1 | * | 6/2012 | Rogner | F16D 25/0638 |
| | | | | 192/85.23 |
| 2017/0284510 A1 | * | 10/2017 | Iwaki | F16D 25/0638 |

FOREIGN PATENT DOCUMENTS

| | | |
|---|---|---|
| DE | 4041117 A1 | 7/1992 |
| DE | 19635867 A1 | 3/1998 |
| DE | 102011113279 A1 | 3/2013 |
| EP | 0338141 A1 | 10/1989 |
| JP | 60146937 A * | 8/1985 ........... F16H 57/021 |

OTHER PUBLICATIONS

Deere & Company, Clutch Release System, Pending Utility U.S. Appl. No. 14/868,515, filed Sep. 29, 2015.
German Search Report for application No. 1020172168315, dated Jul. 16, 2019.

* cited by examiner

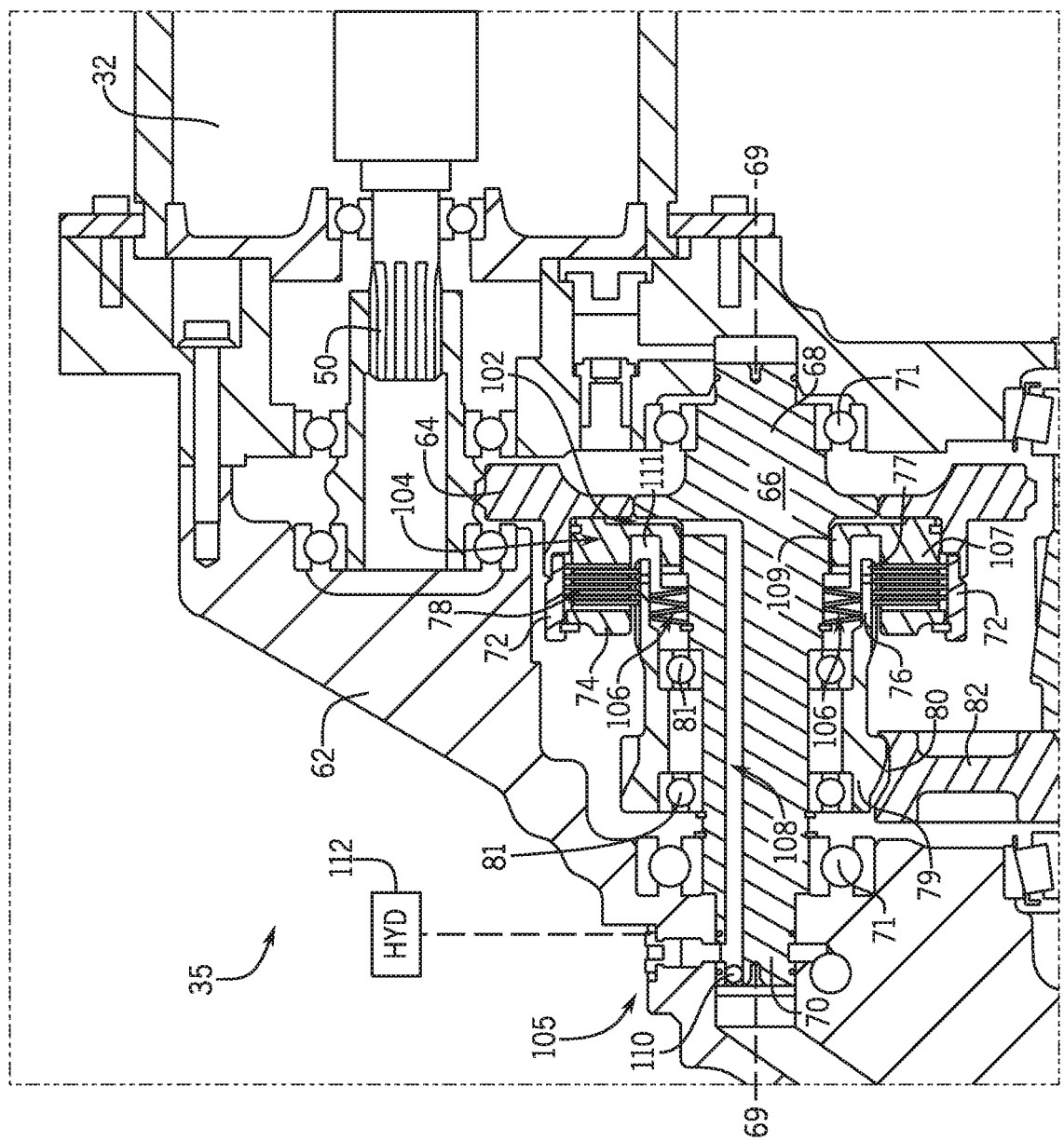

WORK VEHICLE DRIVE ASSEMBLY WITH ELECTRIC MOTOR OVERSPEED PROTECTION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and, more particularly, to overspeed protection for an electric drive assembly.

BACKGROUND OF THE DISCLOSURE

Work vehicles typically include one or more drive assemblies to deliver power to various components (e.g., wheels, implements and so on). A drive assembly may include one or more gear trains that provide various gear ratios between the power source (e.g., engine, motor, etc.) and the powered component. For example, a drive assembly may have a motor that rotates an input shaft (i.e., a driving shaft) at high speed and low torque, and the gear train may transfer torque to a wheel (i.e., the driven shaft or output shaft) so that the wheel rotates at a relatively lower speed and higher torque, at least in one or more operational modes of the drive assembly. In some cases, the gear ratio of the drive assembly may be very high. As a result, the wheel may have a mechanical speed limit. If the wheel rotates above this speed limit (i.e., an overspeed condition), the wheel may effect a backdrive of the gear train and/or the motor, the forces of which may be damaging to the gear train, the motor, or other components of the drive assembly. This may arise, for example, when the work vehicle moves downhill, when the work vehicle is towed, or in other situations, such as when a vehicle is required to operate at high torque and low speed during one or more work modes and at a relatively low torque and high speed during transport or other modes.

SUMMARY OF THE DISCLOSURE

This disclosure provides a drive assembly that is protected against an overspeed condition. The drive assembly may include a clutch that couples a motor and an output shaft during low speed conditions and that decouples the motor and output shaft during high speed conditions.

In one aspect the disclosure provides a drive assembly for a work vehicle, wherein the drive assembly includes an electric motor configured to rotate a driving shaft and includes a gear train configured to transmit torque between the driving shaft and a driven shaft. The drive assembly also includes a clutch member having an engaged position and a disengaged position. The clutch member is configured to allow torque transfer between the driving shaft and the driven shaft when in the engaged position. The clutch member is configured to prevent torque transfer between the driving shaft and the driven shaft when in the disengaged position. The clutch member is biased toward the disengaged position to prevent torque transfer in a direction from the driven shaft toward the driving shaft in an overspeed condition of the drive assembly.

In another aspect, the disclosure provides a drive assembly for a work vehicle, wherein the drive assembly includes a motor configured to rotate a driving shaft and includes a gear train configured to transmit torque between the driving shaft and a driven shaft. The drive assembly also includes clutch member having an engaged position and a disengaged position. The clutch member is configured to allow torque transfer between the driving shaft and the driven shaft when in the engaged position. The clutch member is configured to prevent torque transfer between the driving shaft and the driven shaft when in the disengaged position. The clutch member is biased toward the disengaged position. The drive assembly additionally includes an actuator configured to actuate the clutch member from the disengaged position toward the engaged position. Moreover, the drive assembly includes a control system with at least one processor and at least one sensor in which the processor is configured to receive sensor input from the sensor. The sensor input is indicative of a speed condition of the drive assembly. The processor is in communication with the actuator. The actuator is configured to actuate the clutch member from the disengaged position toward the engaged position based, at least partly, on the sensor input.

The details of one or more embodiments are set forth in the accompanying drawings and the description below. Other features and advantages will become apparent from the description, the drawings, and the claims.

BRIEF DESCRIPTION OF THE DRAWINGS

FIG. 3A is a partial sectional view of the drive assembly of FIG. 2 showing a clutch arrangement in a disengaged position;

Like reference symbols in the various drawings indicate like elements.

DETAILED DESCRIPTION

Figure 1:
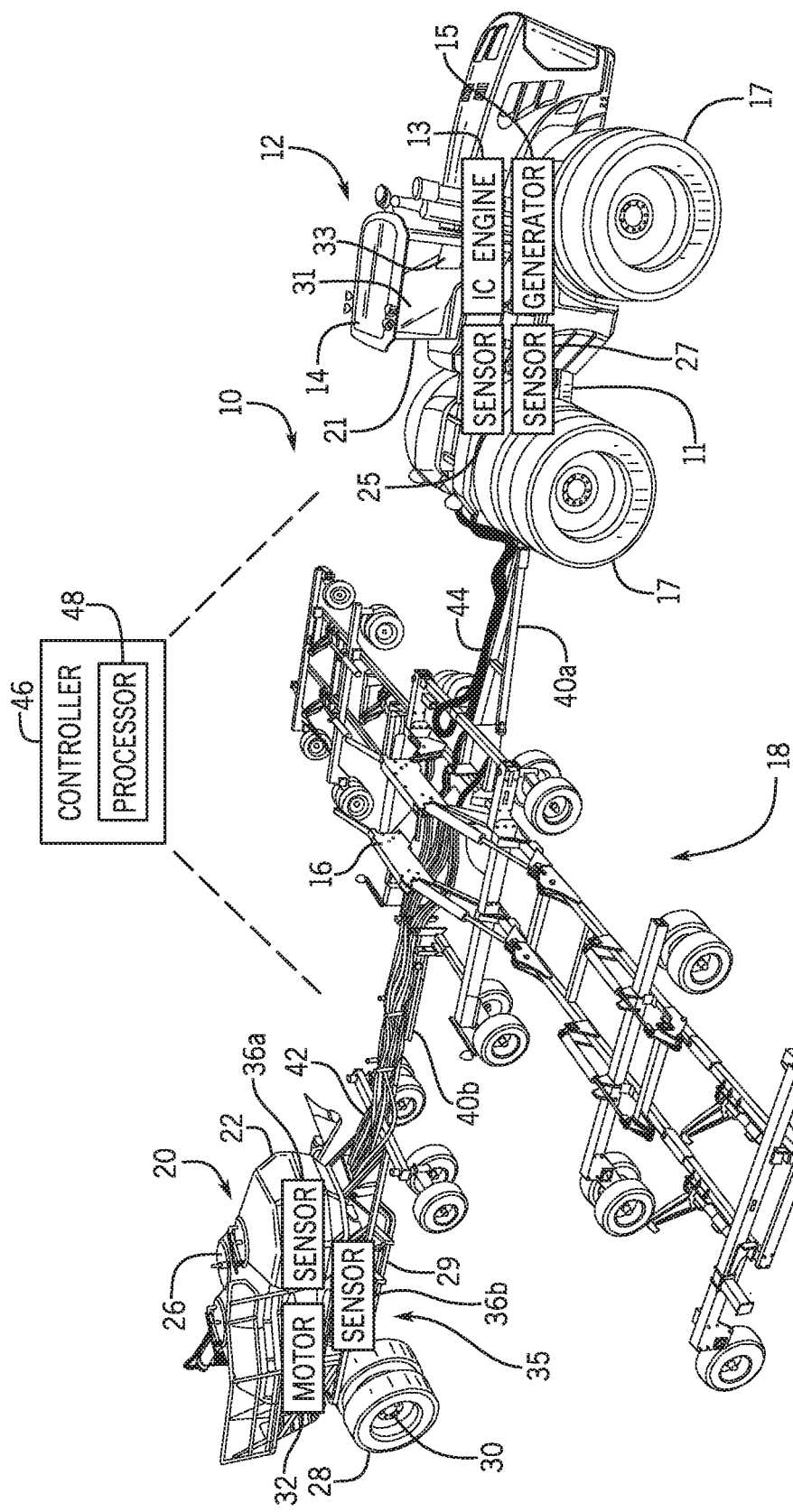
FIG. 1 is a perspective view of an example work vehicle train, including lead and follower vehicles, in the form of an agricultural tractor, a seeding machine and a commodity cart, including a drive assembly according to example embodiments of the present disclosure.

The following describes one or more example embodiments of the disclosed drive assembly for a work vehicle, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "aft," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely example embodiments of the present disclosure.

Conventional techniques related to signal processing, data transmission, signaling, control, and other functional aspects of the systems (and the individual operating components of the systems) may not be described in detail herein for brevity. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The following describes one or more example implementations of the disclosed drive assembly for a work vehicle. The drive assembly may include a motor, such as an electric motor, that supplies torque to a wheel of the work vehicle. The drive assembly may also include a gear train that provides a relatively high gear reduction. This allows the motor and other related equipment to be relatively small and light-duty. Despite this, the gear train increases the amount of torque as it is transferred from the motor to the wheel.

The drive assembly may include a clutch arrangement that engages to allow torque transfer from the motor to the wheel and that disengages to prevent such torque transfer. The drive assembly may also include an actuator (e.g., a hydraulic actuator) configured to actuate to selectively move the clutch arrangement from the disengaged position toward the engaged position.

The clutch may be biased toward the disengaged position to prevent torque transfer in a direction from the wheel toward the motor (i.e., in an overspeed condition of the drive assembly). For example, the clutch may include a biasing member that biases the actuator toward the disengaged position. If the vehicle is moved above a threshold speed (i.e., a mechanical speed limit of the drive assembly) when the clutch is engaged, the clutch disengages to protect the drive assembly from this overspeed condition.

This overspeed protection provided by the clutch allows the work vehicle to travel at higher rates of speed (e.g., during transport, travelling downhill, etc.). Moreover, if there is a power loss, a loss of hydraulic pressure, or other failure, the clutch may default toward the disengaged position, thereby preventing damage to the motor, the gear train, the clutch, and/or other components of the drive assembly.

Additionally, a control system may be included for controlling the clutch (e.g., controlling the actuator that moves the clutch from the disengaged position to the engaged position). In some embodiments, the control system may control the clutch based on one or more sensor inputs (e.g., the speed of one or more components within the drive assembly, and/or an available power level for powering the motor). In some embodiments, there may be redundant checks of these variables to further ensure that engagement of the clutch will not damage the drive assembly.

With reference to the drawings, one or more example implementations of a drive assembly for a work vehicle and methods of operating the drive assembly will now be described. While agricultural work vehicles are illustrated and described herein as example work vehicles, one skilled in the art will recognize that principles of the drive assembly and its methods of operation disclosed herein may be readily adapted for use in other types of work vehicles, including, construction work vehicles, forestry work vehicles, and the like. As such, the present disclosure should not be limited to applications associated with agricultural equipment as shown and described.

FIG. 1 illustrates a convoy 10 of work vehicles 12, 18, 20 according to an example embodiment of the present disclosure. As shown, the vehicles 12, 18, 20 may be attached together for movement as a unit and for tandem operations. The vehicles 12, 18, 20 are attached in sequence so that a first or leader vehicle 12 leads the others. The leader vehicle 12 may pull (tow) at least one of the other vehicles 18, 20. A second or intermediate vehicle 18 may be attached to the leader vehicle 12 and may follow the leader vehicle 12. Furthermore, a third or follower vehicle 20 may be attached to the intermediate vehicle 18 and may follow both the first vehicle 12 and the second vehicle 18. In the embodiment, the vehicles 12, 18, 20 are arranged substantially single file (i.e., substantially parallel to the direction of travel) so that the vehicles 12, 18, 20 substantially travel along the same path in sequence. In other embodiments, the vehicles 12, 18, 20 may be arranged side-to-side (i.e., transverse to the direction of travel). Also, although three work vehicles 12, 18, 20 are shown, the convoy 10 may include less than or more than the three work vehicles 12, 18, 20 shown in FIG. 1.

As shown in FIG. 1, the first vehicle 12 may be a tractor 14. As will be discussed, the tractor 14 may be configured to tow or pull the second vehicle 18 and/or the third vehicle 20. In addition, the generator 15 of the tractor 14 may supply operation power in the form of hydraulic, electrical, and/or mechanical power to the second vehicle 18 and/or the third vehicle 20.

The tractor 14 may include a frame 11 and a chassis 21 that is supported on the frame 11. The chassis 21 may include an operator cabin 31 and an operator interface 33. The operator interface 33 may include one or more input devices with which the user can input a user command. For example, the operator interface 33 may include one or more pedals for changing the speed of the tractor 14, a steering wheel and/or levers for steering the tractor 14 and the like. Also, the operator interface 33 may be used by the operator to turn sub-systems on and off. For example, in some embodiments, the operator interface 33 may be used to turn on/off powered wheels of the third vehicle 20 in some embodiments.

In some embodiments, the frame 11 is supported by plurality of wheels 17. Furthermore, the tractor 14 may include a prime mover, such as an internal combustion engine 13 that supplies torque to one or more of the wheels 17. It will be appreciated that the tractor 14 may include a drive assembly (e.g., a powertrain, a transmission, a gear train, gearbox, etc.) that transmits power from the engine 13 to the wheels 17 for moving the tractor 14.

In some embodiments, the tractor 14 may also include at least one speed sensor 25 configured to detect a speed condition of the tractor 14. For example, in some embodiments, the speed sensor 25 may include a ground speed sensor configured to detect the ground speed of the tractor 14 (i.e., the rate of movement of the tractor 14 relative to the ground) by radar, or other ways. In additional embodiments, the speed sensor 25 may be configured to detect a speed output from the engine 13 (e.g., a motor shaft rotational speed). As will be discussed, the sensor(s) 25 may provide input that affects methods of controlling the third vehicle 20.

Additionally, the tractor 14 may include an electric generator 15. The generator 15 may be of a known type (e.g., with an inverter and other known components). The generator 15 may be operatively connected to the engine 13 in some embodiments and may generate electrical power by converting mechanical energy from the engine 13 into electrical energy. Furthermore, the tractor 14 may include an electrical sensor 27. The electrical sensor 27 may include known components (e.g., a voltmeter, an ammeter, etc.) for detecting an available power level that is available from the generator 15. As will be discussed, the sensor 27 may provide input that affects methods of controlling the third vehicle 20.

The second vehicle 18 may be configured as a planting or seeding machine 16. The illustration of the seeding machine 16 is simplified, and it will be appreciated that the seeding machine 16 may include additional features that are not illustrated. The seeding machine 16 may be operable to create a trough, dispense seeds within the trough, and close the trough for proper growing conditions for the seeds. The seeding machine 16 may receive seeds, fertilizer, and/or other commodities from the third vehicle 20. A network of air conduits or plumbing lines may conduct the commodity-entrained airstreams to a number of deposition tubes, which are arranged in different row units (not shown) laterally spaced across the seeding machine 16. More specifically, a relatively small number of main air lines may initially conduct the commodity-entrained airstreams from the third vehicle 20 to a number of distribution towers mounted to the seeding machine 16 at various locations. The distribution towers may then divide the airstreams amongst a larger number of secondary air lines, which then convey the commodity to the deposition tubes for planting or deposition within the ground. The row units of the seeding machine 16 may also include various ground-engaging tools (only a few of which may be seen in FIG. 1), which assist in the commodity deposition process by, for example, opening furrows, packing soil, and closing furrows over the newly-deposited commodities. In other embodiments, the seeding machine 16 may be replaced with other agricultural machinery, or may be omitted.

Additionally, the third vehicle 20 may be configured as a commodity cart 26. The commodity cart 26 may include a frame 29 that is supported by a plurality of wheels 28. The wheels 28 may be mounted to a respective axle, referred to herein as a driven shaft, or in the illustrated example as output hub 30.

The commodity cart 26 may also include a vessel 22 that is supported by the frame 29 and that contains a product (e.g., agricultural product such as fertilizer, seed, etc.). As will be discussed, product within the vessel 22 may be delivered off board (e.g., to the seeding machine 16) during agricultural operations.

Furthermore, the commodity cart 26 may include at least one drive assembly 35 for drivingly rotating at least one of the wheels 28. In some embodiments, the drive assembly 35 is configured to power only one of the wheels 28 (e.g., one of the rear wheels). The drive assembly 35 may selectively power the respective wheel 28 to apply torque to the ground and overcome rolling resistance across the ground surface. The drive assembly 35 may, therefore, assist in overall propulsion of the convoy of work vehicles 10. In other words, the drive assembly 35 may provide assistance to the tractor 14 to move the commodity cart 26. As will be discussed in detail, the drive assembly 35 may include a power source, such as an onboard motor 32. The drive assembly 35 may also include other components that will be discussed in detail for transferring power from the motor 32 to the output hub 30 and, ultimately, the wheel 28.

In some embodiments, the motor 32 may be an electrical motor. The motor 32 may be operatively connected to the generator 15 of the tractor 14 in some embodiments. Accordingly, the motor 32 of the commodity cart 26 may be configured to generate torque from electric power supplied by the generator 15 of the tractor 14. It will be appreciated, however, that the electric power may be supplied to the motor 32 from another source without departing from the scope of the present disclosure. Moreover, although only one drive assembly 35 is shown in FIG. 1, it will be appreciated that the commodity cart 26 may include at least one additional drive assembly 35, for example, on the opposite side of the commodity cart 26.

In some embodiments, the commodity cart 26 may also include at least one speed sensor 36*a*, 36*b* configured to detect a speed condition of the commodity cart 26. For example, in some embodiments, a motor speed sensor 36*a* may be included for detecting a rotational speed of a shaft of the motor (i.e., the driving shaft or input shaft). Also, in some embodiments, an output speed sensor 36*b* may be included for detecting a rotational speed of the output hub 30 or other driven shaft that is fixed for rotation with the output hub 30. As will be discussed, the sensors 36*a*, 36*b* may provide input that affects methods of controlling the powertrain 34 of the commodity cart 26.

Additionally, a connection system 38 may be included. Generally, the connection system 38 may connect the tractor 14, seeding machine 16, and commodity cart 26 for tandem operation in a convoy. The connection system 38 may include a rigid front tow bar 40a that extends between the tractor 14 and the seeding machine 16 and a rigid rear tow bar 40b that extends between the seeding machine 16 and the commodity cart 26. The connection system 38 may further include a commodity delivery device 42 configured for off board delivery of the product within the vessel 22 to the seeding machine 16 as mentioned above. Furthermore, electrical cables 44 may extend between the tractor 14 and the commodity cart 26 in some embodiments.

Moreover, a control system 46 may be included for controlling one or more components. The control system 46 may be configured as a computing device with an associated processor 48 as well as other associated computing devices (e.g., memory architectures, circuitry, etc.). The control system 46 may be in communication with the drive assembly 35 for controlling its operation as will be discussed. Also, the control system 46 may be in communication with one or more of the sensors 25, 27, 36a, 36b mentioned above. For example, the control system 46 may be configured to receive can bus data from the sensors 25, 27, 36a, 36b. As will be discussed, one or more of the sensors 25, 27, 36a, 36b may provide sensor input (e.g., corresponding to the speed and/or the electrical load detected by the sensors 25, 27, 36a, 36b). Depending on this sensor input, the processor 48 may generate control signals that ultimately control the drive assembly 35 of the commodity cart 26. Also, the control system 46 may be in communication with the operator interface 33. As such, the operator interface 33 may provide user commands, which cooperates to control various components of the drive assembly 35 as will be discussed below.

Figure 2:
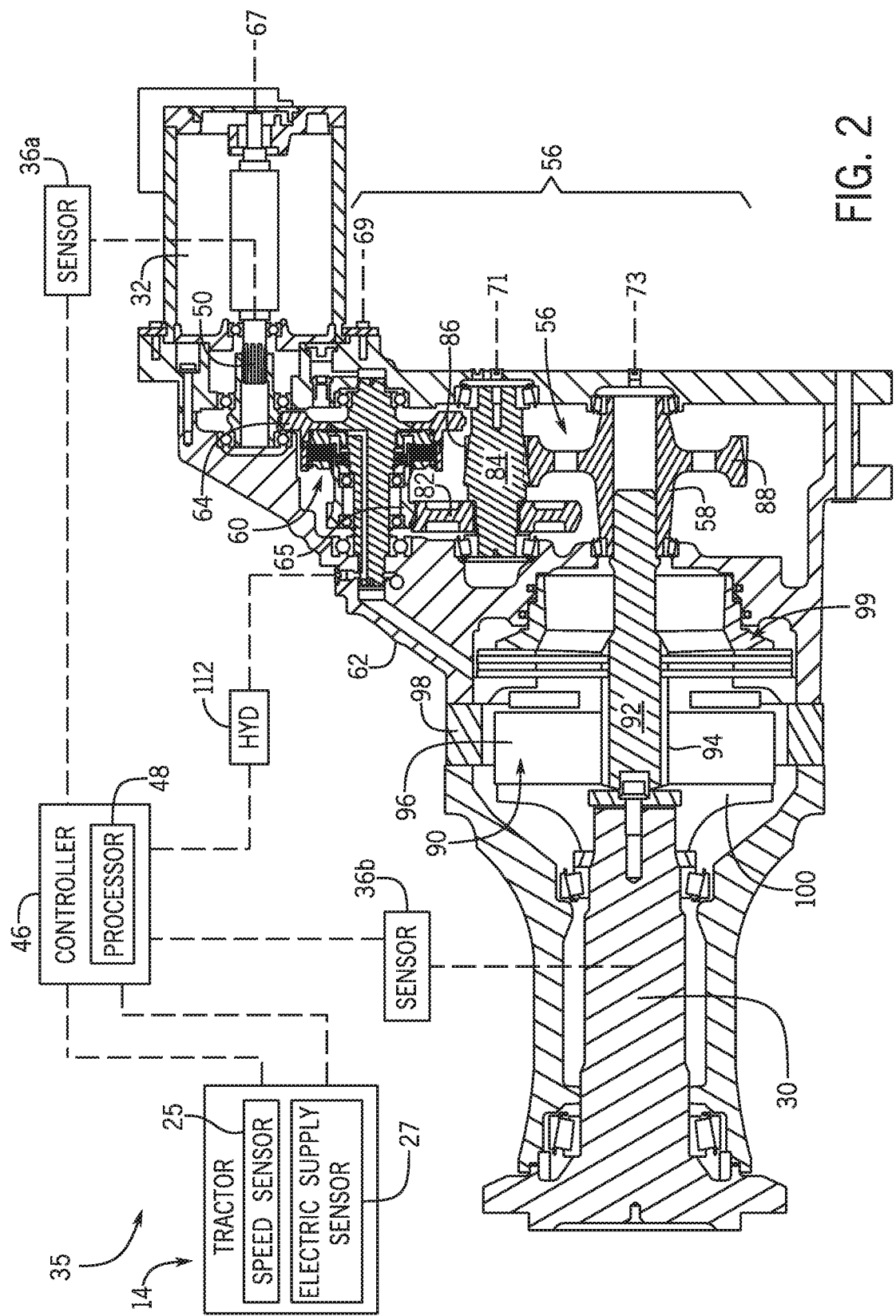
FIG. 2 is a sectional view of a drive assembly of the work vehicle train of FIG. 1 according to example embodiments of the present disclosure.

Referring now to FIG. 2, the drive assembly 35 of the commodity cart 26 will be discussed in greater detail according to example embodiments. Generally, the drive assembly 35 may be considered a "final drive" in that it provides one or more gear ratios delivering power at one or more particular torque and speed values directly to the wheel. However, other drive assembly 35 may be configured differently and applied in other application and arrangements. As shown, the drive assembly 35 may include the electric motor 32, which drivingly rotates a driving shaft 50 (i.e., input shaft or motor shaft). The drive assembly 35 may also include a transmission 56 with a gear train 58 and a clutch member 60. In some embodiments, the transmission 56 provides a single gear ratio between the motor 35 and the output hub 30. Components of the drive assembly 35 may be at least partially enclosed within a housing 62. Also, moveable components of the gear train 58 and/or clutch member 60 may be supported for rotation within the housing 62 by respective bearings (e.g., roller bearings).

Generally, the clutch member 60 may include an input member 64 and an output member. The input member 64 may include gear teeth in some embodiments and may be enmeshed with the driving shaft 50 in some embodiments. The output member 65 may include gear teeth as well and may be enmeshed with the gear train 58 as will be discussed. Thus, as shown in the embodiment of FIG. 2, the clutch member 60 may have an axis of rotation 69 that is spaced apart in a radial direction from an axis of rotation 67 of the driving shaft 50 of the motor 32. In some embodiments, the axes of rotation 67, 69 may be substantially parallel to each other. In other embodiments, the axis of rotation 69 of the clutch member 60 may be coaxial with the driving shaft 50 and/or one of the axes of rotation of the transmission 56. Other components of the clutch member 60 will be discussed in detail below.

Figure 3B:
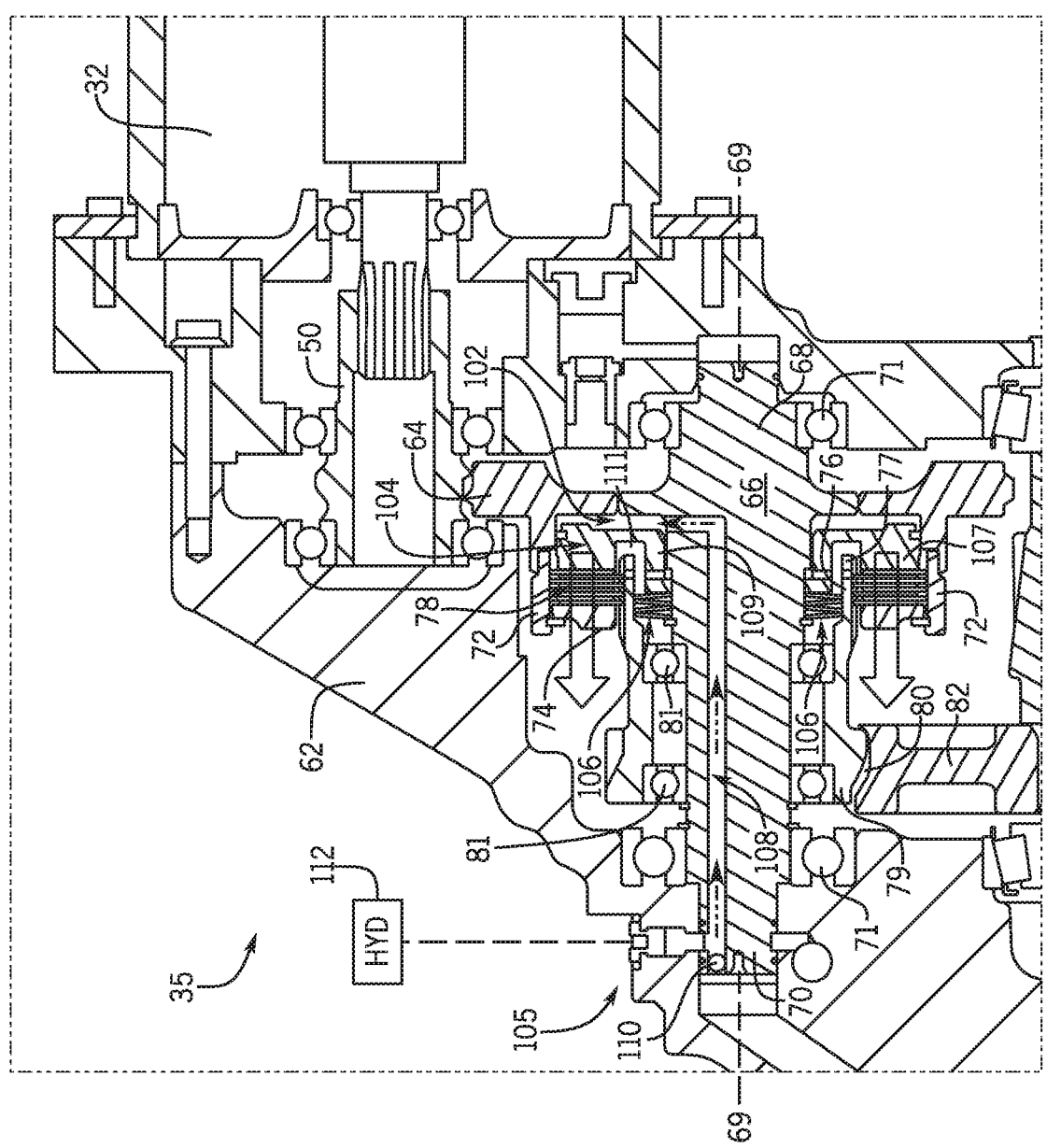
FIG. 3B is a partial sectional view of the drive assembly of FIG. 2 showing a clutch arrangement in an engaged position.

The clutch member 60 may be moveable between a disengaged position (FIG. 3A) and an engaged position (FIG. 3B). When in the engaged position, the drive assembly 35 may deliver torque from the driving shaft 50 to the output hub 30. In contrast, the drive assembly 35 may limit (e.g., prevent) torque transfer between the driving shaft 50 and the output hub 30 when the clutch member 60 is in the disengaged position.

The transmission 56 may include a gear train 58 that provides a gear reduction between the driving shaft 50 and the output hub 30. As such, the high speed, low torque rotation of the driving shaft 50 may be converted to low speed, high torque rotation of the output hub 30. The gear train 58 may have various configurations including the configuration shown in FIG. 2. The gear train 58 may include various types of gears including spur gears, bevel gears, planetary gear sets, or otherwise.

In some embodiments, the gear train 58 may include a first gear 82 that is enmeshed with the output member 65 of the clutch member 60. As such, the first gear 82 may receive torque from the clutch member 60 when the clutch member 60 is in the engaged position. The first gear 82 may also be fixed on an intermediate shaft 84. In other words, the first gear 82 may be fixed for rotation with the intermediate shaft 84 as a unit. The first gear 82 and the intermediate shaft 84 may have an axis of rotation 71. The axis 71 of the intermediate shaft 84 and first gear 82 may also be spaced apart from and substantially parallel to the axis of rotation 69 of the clutch member 60.

The gear train 58 may additionally include a second gear 86. The second gear 86 may be a helical gear. The second gear 86 may be fixed on the intermediate shaft 84. Thus, the second gear 86 may be coaxial with that of the first gear 82 for common rotation about the axis of rotation 71.

Moreover, the gear train 58 may include a third gear 88. The third gear 88 may be a helical gear that is enmeshed with the second gear 86. An axis of rotation 73 of the third gear 88 may be spaced apart from and substantially parallel to the axis of rotation 71 of the second gear 86. The third gear 88 may be fixed on a sun shaft 92. Thus, the sun shaft 92 may be coaxial with the third gear 88.

The gear train 58 may further include a planetary gear set 90. The planetary gear set 90 may include a sun gear 94, a plurality of planet gears 96, and a ring gear 98. The sun gear 94 may be fixed on the sun shaft 92. Thus, the sun gear 94 may be fixed for rotation with the third gear 88. The sun gear 94 may also be coaxial with the third gear 88 for common rotation about the axis 73. The planetary gear set 90 may additionally include a plurality of planet gears 96 that are disposed between and meshed with both the sun shaft 92 and the ring gear 98. The ring gear 98 may be fixed to the housing 62. The planetary gear set 90 may also include a carrier 100, which is coupled to the planet gears 96. The output hub 30 may be fixed to the carrier 100. Accordingly, the output hub 30 may be fixed for rotation with the carrier 100.

Accordingly, assuming that the clutch member 60 is in the engaged position (FIG. 3B), torque from the motor 32 may drive and rotate the driving shaft 50. This torque may transfer from the input member 64 to the output member 65 of the engaged clutch member 60. As a result, the first gear 82 of the gear train 58 may rotate in unison with the intermediate shaft 84 and the second gear 86. This causes rotation of the third gear 88, sun shaft 92, and sun gear 94. Torque is transferred to the planet gears 96 to rotate the carrier 100 and, ultimately, the output hub 30.

In some embodiments, the drive assembly 35 may additionally include a brake assembly 99. The brake assembly 99 may be supported by the housing 62, proximate the planetary gear set 90. In some embodiments, the brake assembly 99 may be configured to brake and alternately release the sun shaft 92.

Referring now to FIGS. 3A and 3B, the clutch member 60 will be discussed in greater detail according to example embodiments. The clutch member 60 may include the input member 64. The input member 64 may resemble a spur gear and may be fixed on a coaxial clutch shaft 66.

The clutch shaft 66 may include a first end 68 and a second end 70. The clutch shaft 66 may be substantially centered on an axis of rotation 69. The first end 68 and the second end 70 of the clutch shaft 66 may be supported for rotation relative to the housing 62 by a plurality of bearings (e.g., roller bearings). The input member 64 may be fixed to the clutch shaft 66 proximate the first end 68.

An outer cylinder 72 may be fixed to an axial face of the input member 64. As such, the outer cylinder 72 may be fixed to rotate with the input member 64. The outer cylinder 72 may annularly extend about the clutch shaft 66 and may be coaxial with the input member 64 and the clutch shaft 66.

Additionally, a disc 74 may be fixed to the outer cylinder 72. The disc 74 may be disposed on an opposite end of the outer cylinder 72 from the input member 64. Also, the disc 74 may extend inward radially from the outer cylinder 72 toward the axis of rotation 69.

The clutch member 60 may further include a clutch hub 76. The clutch hub 76 may be generally cylindrical and may extend annularly about the shaft 66. The clutch hub 76 may be coaxial with the shaft 66 and the outer cylinder 72. The clutch hub 76 may include a first end 77 and a second end 79 that are spaced apart along the axis 69. The clutch hub 76 may be supported for relative rotation on the clutch shaft 66 by a plurality of bearings 81 (e.g., roller bearings). Additionally, the first end 77 of the clutch hub 76 may be received within the disc 74 and outer cylinder 72. Also, the first end 77 of the clutch hub 76 may radially oppose the outer cylinder 72. The second end 79 of the clutch hub 76 may include the output member 80. The output member 80 may include a plurality of gear-like teeth that are enmeshed with the first gear 82 of the transmission 56 as described above with respect to FIG. 2.

The clutch member 60 may additionally include a clutch pack 78. The clutch pack 78 may be disposed between the outer cylinder 72 and the clutch hub 76 in the radial direction. The clutch pack 78 may also be disposed between the disc 74 and a piston 104 in the axial direction. The clutch pack 78 may be a known clutch pack with a series of alternating friction plates and separator plates—some of which are fixed to the outer cylinder 72 and others of which are fixed to the clutch hub 76.

The piston 104 may be part of an actuator 105 used to actuate the clutch member 60 between the disengaged and engaged positions. The piston 104 may be disposed within a chamber 102. The chamber 102 may be defined between the clutch hub 76 and the outer cylinder 72 (in the radial direction) and the input member 64 and the disc 74 (in the axial direction). In some embodiments, the piston 104 may move in the axial direction (i.e. along the axis and substantially parallel to the axis 69) when moving the clutch member 60 between the disengaged and engaged positions. In some embodiments, the piston 104 moves in one direction along the axis 69 to engage the clutch member 60, and the piston 104 moves in the opposite direction along the axis 69 to disengage the clutch member 60.

The piston 104 may include an inner diameter portion 109, an outer diameter portion 107, and an aperture 111 defined between the inner and outer diameter portions 107, 109. The aperture 111 may be a circular groove or channel on an axial face of the piston 104. An axial face of the outer diameter portion 107 may abut and engage the clutch pack 78. A common axial face of the inner diameter portion 109 may abut and engage a biasing member 106 of the clutch member 60. The aperture 111 may receive the first end 77 of the clutch hub 76 as the piston 104 moves.

The actuator 105 may be a hydraulic actuator in some embodiments. As such, the clutch member 60 may include a hydraulic line 108 and a hydraulic pump 112. The hydraulic line 108 may extend substantially axially through the clutch shaft 66. One end of the line 108 may extend radially outward to communicate fluidly with the chamber 102. The opposite end of the line 108 may include a valve 110. The valve 110 may be operably connected to a hydraulic pump 112. In some embodiments, the valve 110 may be a proportional valve, which provides proportional control of the hydraulic pressure for moving the piston 104. In other embodiments, the valve 110 may be an ON/OFF valve.

The biasing member 106 may be disposed between the clutch shaft 66 and the clutch hub 76 in the radial direction. In some embodiments, the biasing member 106 may be a series of Belleville washers. As stated, the inner diameter portion 109 of the piston 104 may abut the biasing member 106 as the piston 104 moves. It will be appreciated that the biasing member 106 may bias the piston 104 axially away from the disc 74. Thus, as will be discussed below, the biasing member 106 may provide a biasing force that biases the clutch member 60 toward the disengaged position (FIG. 3A).

The actuator 105 may actuate the clutch member 60 from the disengaged position (FIG. 3A) toward the engaged position (FIG. 3B), against the biasing force provided by the biasing member 106. Specifically, the pump 112 may selectively increase pressure in the line 108 and the chamber 102, causing the piston 104 to move substantially parallel to the axis 69 (FIG. 3B), against the biasing force from the biasing member 106, toward the disc 74. Accordingly, the clutch pack 78 is compressed between the inner diameter portion 109 of the piston 104 and the disc 74. Eventually the friction and separator plates of the clutch pack 78 lock together in rotation such that the clutch member 60 is in the engaged position.

Accordingly, when in the engaged position, torque may transfer from the motor driving shaft 50, to the input member 64, to the outer cylinder 72, to the clutch hub 76, to the output member 80. This torque may be transferred through the transmission 56 to the output hub 30 as described in detail above.

When pressure is reduced in the hydraulic line 108, the biasing member 106 may bias the piston 104 away from the disc 74 and toward the input member 64. Accordingly, the friction and separator plates of the clutch pack 78 may be released, thereby allowing relative rotation between the inner cylinder and the clutch hub 72, 76, and thereby moving the clutch member 60 to its disengaged position.

Figure 4:
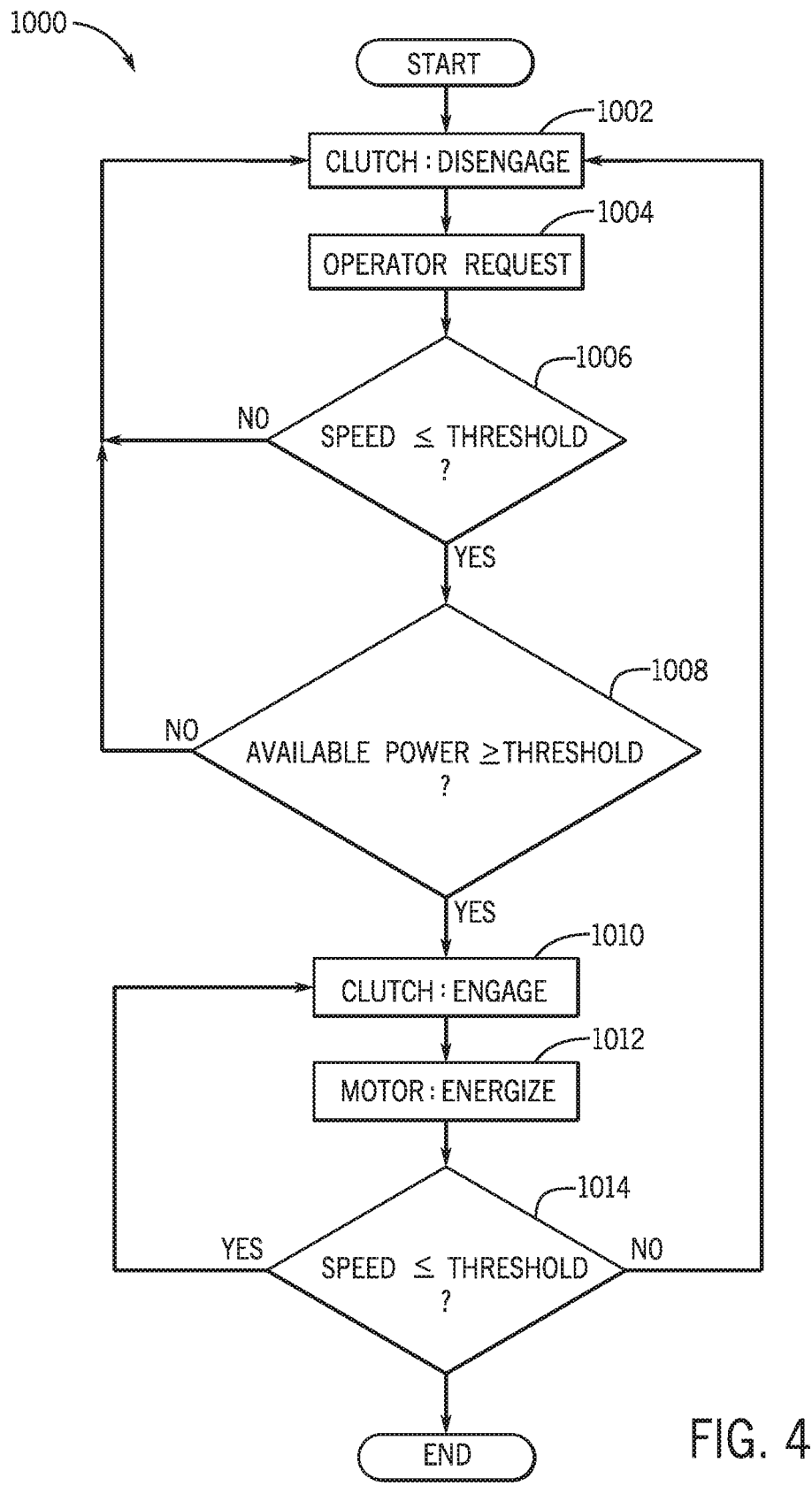
FIG. 4 is a flowchart illustrating a method of operating the disclosed drive assembly according to example embodiments of the present disclosure.

Referring now to FIG. 4, a method 1000 of operating the drive assembly 35 of the commodity cart 26 will be discussed according to example embodiments. In some embodiments, the method 1000 may be employed by the control system 46 (FIG. 1).

The method 1000 may begin at 1002, wherein the clutch member 60 is disengaged. Again, the clutch member 60 may be biased toward the disengaged position. Thus, 1002 of the method 1000 may be omitted in some embodiments. The method 1002 may continue at 1004, wherein an operator request is received (via the operator interface 33) to engage the clutch member 60.

At 1006, the processor 48 may determine that the commodity cart 26 is travelling slow enough to engage the clutch member 60 without causing damage to the drive assembly 35. In some embodiments, at 1006 the processor 48 may receive one or more sensor inputs related to the speed of the commodity cart 26 and/or the speed of the tractor 14. For example, the processor 48 may receive motor speed sensor input from the sensor 36a relating to the input rotational speed of the driving shaft 50. Also, the processor 48 may receive wheel speed sensor input from the sensor 36b relating to the output rotational speed of the output hub 30. Additionally, the processor 48 may receive sensor input from the sensor 25 relating to the speed condition (e.g., the ground speed) of the tractor 14. In some embodiments, the processor 48 may receive sensor inputs from each of the sensors 36a, 36b, 25, and the processor 48 may compare those inputs to respective threshold speeds. If any of the detected speeds from the sensors 36a, 36b, 25 are greater than the respective thresholds, then the method 1006 may loop back to 1002 to keep the clutch member 60 in the disengaged position. If, however, at 1006 the detected speeds are less than or equal to the respective thresholds, then the method 1000 may continue at 1008. It will be appreciated that the thresholds of 1006 may be any suitable speed. For example, in some embodiments, the powertrain 54 and/or motor may operate safely (i.e., without damage) when the commodity cart 26 is travelling at speeds below approximately 40 km/hr. Thus, the thresholds of 1006 may be based on that speed limit or, in some embodiments, a margin of safety below that speed limit. Specifically, the speed threshold for the sensors 36a, 36b, 25 may correspond to a ground speed of about 20-30 km/hr in some embodiments.

At 1008, the processor 48 may determine whether there is sufficient electrical supply to adequately power the electric motor 32. The processor 48 may receive sensor input from the electrical sensor 27. Also, the processor 48 may compare the available power level detected by the sensor 27 to a predetermined threshold. If the detected available power level is less than the threshold, then the method 1000 may loop back to 1002 to keep the clutch member 60 in the disengaged position. If, however, at 1008 that the detected power level is greater than or equal to the threshold, then the method may continue to 1010.

At 1010, the processor 48 may communicate with the actuator 105 (e.g., send control signals) to move the clutch member 60 from the disengaged position (FIG. 3A) to the engaged position (FIG. 3B). As discussed above, the control system 46 may cause the hydraulic pump 112 to pressurize the hydraulic line 108, causing the piston 104 to move against the biasing force supplied by the biasing member 106, and engaging the clutch member 60.

Next, at 1012, the processor 48 may communicate with the motor 32 (e.g., send control signals) to energize the motor 32. As mentioned above, torque generated by the motor 32 may transfer through the clutch member 60, through the transmission 56, and to the output hub 30 and wheel 28.

Next, at 1014, the control system 46 may continue to monitor the speed of the commodity cart 26 via the sensors 36a, 36b, 25 while the clutch member 60 is engaged and/or the motor 32 is energized. At 1014, the control system 46 may perform operations similar to those performed at 1006. Specifically, the control system 46 may determine if the speed conditions detected by one or more of the sensors 36a, 36b, 25 are less than or equal to the threshold speed(s). If the speeds detected by the sensors 36a, 36b, 25 remain under the respective threshold(s), then the method 100 may loop back to 1010, such that the clutch member 60 remains in the engaged position. If, however, the detected speed exceeds the predetermined threshold, then the method may loop back to 1002 to disengage the clutch member 60. Specifically, the control system 46 may communicate with hydraulic pump 112 for reducing pressure in the hydraulic line 108, causing the biasing force from the biasing member 106 to bias the piston 104 away from the clutch pack 78. Accordingly, the clutch member 60 may be automatically disengaged in an overspeed condition, preventing backdrive from the wheel 28 (i.e., preventing torque from transferring from the output hub 30 toward the motor 32).

In this embodiment, the control system 46 may redundantly check (e.g., at 1006) to ensure that the commodity cart 26 is travelling slow enough to engage the clutch member 60. The actuator 105 actuates the clutch member 60 away from the disengaged position toward the engaged position based on multiple different sensor inputs from the sensors 36a, 36b, 25. Similarly, once the clutch member 60 is engaged and the motor 32 is energized, the actuator 105 may continue to redundantly check the output from the sensors 36a, 36b, 25 to ensure that the commodity cart 26 is travelling slow enough to keep the clutch member 60 engaged. This redundancy may help to increase control accuracy and to reduce the chances of damage to the motor 32 and/or powertrain 54 due to high speeds.

Additionally, because the clutch member 60 is biased toward the disengaged position, the drive assembly 35 may be protected in other situations. For example, if there is a power loss, inadvertent pressure loss in the hydraulic line 108, or other failure, the clutch member 60 may biasingly disengage and prevent damage to the drive assembly 35.

Moreover, the drive assembly 35 may provide a relatively high gear reduction. This allows the motor 32 and related electrical equipment to be relatively light duty and compact. Additionally, the drive assembly 35 and the clutch member 60 may be relatively compact and lightweight.

It will be appreciated that the features and methods of the present disclosure may vary from those illustrated. For example, the control system 46 may receive input from other sensors when determining whether to engage the clutch member 60. Specifically, in some embodiments, the control system 46 may receive sensor input from a pressure sensor that detects hydraulic pressure within the hydraulic line 108 or chamber 102. If the pressure exceeds a threshold, then the control system 46 may allow the clutch member 60 to bias toward the disengaged position. Other sensors may detect other conditions, such as available coolant levels for cooling components of the powertrain 54 and/or motor 32 and provide this input to the control system 46 for control of the clutch member 60 as well.

Any flowchart and block diagrams in the figures, or similar discussion above, may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block (or otherwise described herein) may occur out of the order noted in the figures. For example, two blocks shown in succession (or two operations described in succession) may, in fact, be executed substantially concurrently, or the blocks (or operations) may sometimes be executed in the reverse order, depending upon the functionality involved. It will also be noted that each block of any block diagram and/or flowchart illustration, and combinations of blocks in any block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A final drive for a work vehicle, comprising:
    a housing;
    an output hub mounted for relative to the housing and configured to couple to a wheel of the work vehicle;
    a motor mounted to the housing and configured to rotate a driving shaft extending into the housing;
    a transmission contained within the housing and having:
        a clutch including:
            a clutch shaft coupled to the driving shaft;
            a clutch pack supported by the clutch shaft and movable between an engaged position and a disengaged position;
            a biasing member applying a biasing force to the clutch pack toward the disengaged position;
            an actuator configured to move the clutch pack against the biasing force from the disengaged position to the engaged position; and
            a clutch hub supported by the clutch shaft for relative rotation when the clutch pack is in the disengaged position; and
        a gear train including:
            an intermediate shaft;
            a first gear coupled to the intermediate shaft and to the clutch hub;
            a second gear coupled to the intermediate shaft; and
            a reduction gear set coupled to the second gear and to the output hub, the gear reduction set is a planetary gear set that includes a sun shaft, a plurality of planet gears, and a carrier for the plurality of planet gears, the sun shaft is fixed for rotation with the second gear and the driven shaft is fixed for rotation with the carrier; and
    a controller with at least one processor configured to control the actuator to move the clutch pack to the engaged position to transfer torque from the clutch shaft to the clutch hub and thereby through the gear train to the output hub;
    wherein, in an overspeed condition, the controller permits the clutch pack, under the biasing force from the biasing member, to be in the disengaged position to prevent torque transfer between the clutch shaft and the clutch hub and thereby from the output hub to the motor.

2. The final drive of claim 1, wherein the driving shaft is configured to rotate about a first axis of rotation with respect to the housing;
    wherein the clutch shaft is configured to rotate about a second axis of rotation with respect to the housing;
    wherein the intermediate shaft is configured to rotate about a third axis of rotation with respect to the housing;
    wherein the reduction gear set includes a shaft configured to rotate about a fourth axis of rotation with respect to the housing;
    wherein the first, second, third and fourth second axes of rotation extend through the housing substantially parallel to and spaced apart from one another.

3. The final drive of claim 1, wherein the actuator is a hydraulically operated piston.

4. The final drive of claim 3, wherein the piston includes a first portion configured to abut the clutch pack and a second portion configured to abut the biasing member, the first portion and the second portion separated in a radial direction relative to the clutch shaft such that the second portion is disposed between the first portion and the clutch shaft.

5. The final drive of claim 4, wherein the piston includes an aperture between the first portion and the second portion configured to receive at least a portion of the clutch hub when the clutch pack is in the engaged position.

6. The final drive of claim 1, wherein the clutch hub is supported for rotation relative to the clutch shaft by a bearing disposed between the clutch hub and the clutch shaft.

7. The final drive of claim 1, wherein the clutch shaft defines an input member receiving torque from the driving shaft; and
    wherein the clutch hub defines an output member transmitting torque to the first gear.

8. The final drive of claim 1, further including at least one sensor providing sensor input to the processor indicative of a speed or power condition of the final drive;
    wherein the controller controls the actuator to move the clutch pack from the disengaged position to the engaged position based, at least partly, on the sensor input.

9. The final drive of claim 8, wherein the driving shaft is configured to rotate at a motor speed;
    wherein the sensor is configured to detect the motor speed, the sensor input corresponding to the detected motor speed;
    wherein the controller is configured to compare the detected motor speed and a predetermined threshold motor speed and determine when the detected motor speed is less than or equal to the threshold motor speed; and wherein the controller is configured to control the actuator to move the clutch pack from the disengaged position to the engaged position, at least in part, based on the determination that the detected motor speed is less than or equal to the threshold motor speed.

10. The final drive of claim 8, further including a user input device configured for input to the controller a user command for energizing the motor;
wherein the controller is configured to control the actuator to move the clutch pack from the disengaged position to the engaged position based on the sensor input and the user command.

11. A final drive for a work vehicle, comprising:
a housing;
an output hub mounted for relative to the housing and configured to couple to a wheel of the work vehicle;
a motor mounted to the housing and configured to rotate a driving shaft extending into the housing;
a transmission contained within the housing and having:
    a clutch including:
        a clutch shaft coupled to the driving shaft;
        a clutch pack supported by the clutch shaft and movable between an engaged position and a disengaged position;
        a biasing member applying a biasing force to the clutch pack toward the disengaged position;
        an actuator configured to move the clutch pack against the biasing force from the disengaged position to the engaged position; and
        a clutch hub supported by the clutch shaft for relative rotation when the clutch pack is in the disengaged position; and
    a gear train including:
        an intermediate shaft;
        a first gear coupled to the intermediate shaft and to the clutch hub;
        a second gear coupled to the intermediate shaft; and
        a reduction gear set coupled to the second gear and to the output hub;
a controller with at least one processor configured to control the actuator to move the clutch pack to the engaged position to transfer torque from the clutch shaft to the clutch hub and thereby through the gear train to the output hub; and
at least one sensor providing sensor input to the processor indicative of a speed or power condition of the final drive;
wherein, in an overspeed condition, the controller permits the clutch pack, under the biasing force from the biasing member, to be in the disengaged position to prevent torque transfer between the clutch shaft and the clutch hub and thereby from the output hub to the motor;
wherein the output hub is configured to rotate at an output speed;
wherein the sensor is configured to detect the output speed, the sensor input corresponding to the detected output speed;
wherein the controller is configured to compare the detected output speed and a predetermined threshold output speed and determine when the detected output speed is less than or equal to the threshold output speed; and
wherein the controller is configured to control the actuator to move the clutch pack from the disengaged position to the engaged position, at least in part, based on the determination that the detected output speed is less than or equal to the threshold output speed.

12. A final drive for a work vehicle, comprising:
a housing;
an output hub mounted for relative to the housing and configured to couple to a wheel of the work vehicle;
a motor mounted to the housing and configured to rotate a driving shaft extending into the housing;
a transmission contained within the housing and having:
    a clutch including:
        a clutch shaft coupled to the driving shaft;
        a clutch pack supported by the clutch shaft and movable between an engaged position and a disengaged position;
        a biasing member applying a biasing force to the clutch pack toward the disengaged position;
        an actuator configured to move the clutch pack against the biasing force from the disengaged position to the engaged position; and
        a clutch hub supported by the clutch shaft for relative rotation when the clutch pack is in the disengaged position; and
    a gear train including:
        an intermediate shaft;
        a first gear coupled to the intermediate shaft and to the clutch hub;
        a second gear coupled to the intermediate shaft; and
        a reduction gear set coupled to the second gear and to the output hub;
a controller with at least one processor configured to control the actuator to move the clutch pack to the engaged position to transfer torque from the clutch shaft to the clutch hub and thereby through the gear train to the output hub; and
at least one sensor providing sensor input to the processor indicative of a speed or power condition of the final drive;
wherein, in an overspeed condition, the controller permits the clutch pack, under the biasing force from the biasing member, to be in the disengaged position to prevent torque transfer between the clutch shaft and the clutch hub and thereby from the output hub to the motor;
wherein the motor is an electric motor and the at least one sensor includes a first sensor and a second sensor;
wherein the first sensor is configured to detect a speed of the final drive and to provide, to the controller, a first sensor input indicative of the detected speed;
wherein the second sensor is configured to detect a power level available to the electric motor and to provide, to the controller, a second sensor input indicative of the detected power level;
wherein the controller is configured to compare the detected speed and a predetermined threshold speed and determine when the detected speed is less than or equal to the threshold speed;
wherein the controller is configured to compare the detected power level and a predetermined threshold power level and determine when the detected power level is greater than or equal to the threshold power level; and
wherein the controller is configured to control the actuator to move the clutch pack from the disengaged position to the engaged position based on the determination that the detected speed is less than or equal to the threshold speed and the determination that the detected power level is greater than or equal to the threshold power level.

13. The final drive of claim 12, wherein the second sensor is configured to detect a power level available from a generator coupled to the electric motor.

* * * * *